(12) United States Patent
Kemler et al.

(10) Patent No.: US 9,020,717 B2
(45) Date of Patent: Apr. 28, 2015

(54) METHOD FOR CONTROLLING AN AUTOMATED MOTOR VEHICLE TRANSMISSION

(71) Applicant: ZF Friedrichshafen AG, Friedrichshafen (DE)

(72) Inventors: Johannes Kemler, Ravensburg (DE); Maik Wuerthner, Markdorf (DE); Joachim Staudinger, Memmingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/322,958

(22) Filed: Jul. 3, 2014

(65) Prior Publication Data

US 2015/0032346 A1 Jan. 29, 2015

(30) Foreign Application Priority Data

Jul. 29, 2013 (DE) .......................... 10 2013 214 762

(51) Int. Cl.
  *G06F 19/00* (2011.01)
  *F16H 61/02* (2006.01)
(52) U.S. Cl.
  CPC .................................. *F16H 61/0204* (2013.01)
(58) Field of Classification Search
  None
  See application file for complete search history.

(56) References Cited

U.S. PATENT DOCUMENTS

| | | | |
|---|---|---|---|
| 5,754,968 A | | 5/1998 | Hedstrom |
| 5,832,400 A | * | 11/1998 | Takahashi et al. .............. 701/53 |
| 6,085,137 A | | 7/2000 | Aruga et al. |
| 6,456,919 B1 | | 9/2002 | Korner et al. |
| 6,500,091 B2 | * | 12/2002 | Yeo ................................. 477/97 |
| 6,725,144 B2 | * | 4/2004 | Shiimado et al. ............... 701/65 |
| 7,556,586 B2 | | 7/2009 | Nakagawa et al. |
| 7,912,615 B2 | * | 3/2011 | Lindgren et al. ................ 701/55 |
| 7,979,185 B2 | * | 7/2011 | Wolfgang et al. ............... 701/64 |
| 8,301,349 B2 | * | 10/2012 | Sauter ............................. 701/62 |
| 8,489,292 B2 | | 7/2013 | Matsunaga et al. |
| 2005/0218718 A1 | | 10/2005 | Iwatsuki et al. |
| 2011/0208395 A1 | | 8/2011 | Doebele et al. |

(Continued)

FOREIGN PATENT DOCUMENTS

| DE | 33 34 716 A1 | 4/1985 |
|---|---|---|
| DE | 195 09 175 A1 | 9/1995 |

(Continued)

OTHER PUBLICATIONS

German Search Report Corresponding to 10 2013 214 762.7 mailed May 30, 2014 8 pages.

*Primary Examiner* — Dirk Wright
(74) *Attorney, Agent, or Firm* — Davis & Bujold, P.L.L.C.; Michael J. Bujold

(57) ABSTRACT

A method of controlling an automated motor vehicle transmission. A current driving resistance is taken into account when selecting a target gear to be engaged as part of a shifting process. In order to be able to regulate shifting processes in a driving-resistance-dependent manner so as to ensure that the motor vehicle can always able to continue driving on, during selection of the target gear, disregarding gears for shifting from a currently engaged gear, in a driving-resistance-dependent manner, when the required associated shifting times are longer than a respective permitted maximum shifting time. In connection with the above, the method is incorporated in an automated motor vehicle transmission, a computer program product and a data carrier, containing the computer program product.

11 Claims, 2 Drawing Sheets

(56) References Cited

U.S. PATENT DOCUMENTS

2012/0129649 A1     5/2012   Kaltenbach
2014/0172256 A1*   6/2014   Landes et al. .................. 701/65

FOREIGN PATENT DOCUMENTS

| | | |
|---|---|---|
| DE | 198 54 254 A1 | 5/2000 |
| DE | 103 08 719 A1 | 10/2003 |
| DE | 697 27 789 T2 | 12/2004 |
| DE | 10 2005 015 819 A1 | 10/2005 |
| DE | 10 2006 024 277 A1 | 12/2007 |
| DE | 11 2005 001 726 T5 | 4/2010 |
| DE | 10 2009 046 442 A1 | 6/2010 |
| DE | 10 2009 015 165 A1 | 10/2010 |
| DE | 10 2010 054 571 A1 | 8/2011 |
| DE | 10 2010 061 823 A1 | 5/2012 |

\* cited by examiner

METHOD FOR CONTROLLING AN AUTOMATED MOTOR VEHICLE TRANSMISSION

This application claims priority from German patent application serial no. 10 2013 214 762.7 filed Jul. 29, 2013.

FIELD OF THE INVENTION

The invention concerns a method for controlling an automated motor vehicle transmission, wherein for the selection of a target gear to be engaged during a shifting process a current driving resistance is taken into account. In addition the invention relates to an automated motor vehicle transmission, a computer program product and a data carrier that contains the computer program product.

BACKGROUND OF THE INVENTION

In commercial vehicles automated motor vehicle transmissions are often used, which, to obtain a large number of engageable gears while at the same time having a compact structure, and are in many cases designed as group assemblies in which a plurality of individual gear systems are combined with one another. However, a group configuration also has the result that during gearshifts several individual shifts sometimes have to take place in the individual gear systems, with the consequence that shifting times are correspondingly long. Whereas it is true that on a level stretch of road this reduces comfort but is otherwise relatively unproblematic, on uphill roads and in particular with heavy-load and off-road vehicles a long shifting time can have the result that while the shifting process is being completed the motor vehicle concerned may come to a standstill, or indeed the target gear originally selected may no longer be suitable for continuing to drive on because the speed of the motor vehicle has already fallen too low. For that reason, during the control of an automated motor vehicle transmission a current driving resistance in the form of a road-inclination-related resistance is often also taken into account in order to avoid the aforesaid problems by adapting a shifting strategy to suit the road inclination at the time.

DE 10 2006 024 277 A1 describes a method for controlling an automated motor vehicle transmission, in which method, to select a target gear during a shifting operation, a current driving resistance of the vehicle concerned is taken into account, inter alia in the form of a current road inclination. In this case a transmission control system decides which target gear should be shifted to, as a function of the driving resistance determined at the time. In some circumstances it may even happen that a gear which has just been disengaged is re-engaged.

SUMMARY OF THE INVENTION

Starting from the above-described prior art, the purpose of the present invention is now to provide a method for the control of an automated motor vehicle transmission, by means of which, shifting processes can be controlled as a function of driving resistance in such manner that the motor vehicle can always continue driving on.

From the process-technology standpoint this objective is achieved with the method described below. In relation to an automated motor vehicle transmission the objective is achieved by the technical principle described below. A computer program product and a storage medium containing it, are also described below.

According to the invention, in a method for controlling an automated motor vehicle transmission for the selection of a target gear that is to be engaged during a gearshift process, a current driving resistance is taken into account, In the context of the invention the current driving resistance can be determined by means of appropriate sensors or, however, by computational means. The ultimate selection of a target gear is then made by a transmission control unit of the automated motor vehicle transmission, to which the corresponding data about the current driving resistance are communicated by way of a data bus system of the motor vehicle, either in the form of parameters determined by sensors, or of computation results. In some cases, however, the transmission control unit can itself calculate the current driving resistance from appropriate parameters.

In the present context "driving resistance" is understood to mean a road-inclination-related driving resistance of the motor vehicle concerned, in which a current road inclination and a vehicle mass are involved. However, the driving resistance can just as well be an overall driving resistance of the motor vehicle in which, besides a road-inclination-related resistance, also a rolling resistance, an air resistance and an acceleration resistance are significant. Moreover, as an alternative to the road-inclination-related resistance some other of the above resistances, alone or in combination with one or more other resistances can be used in the method according to the invention.

Thus, particularly in off-road applications a rolling resistance can be important when a gearshift has to be controlled when driving on soft ground. In the case of the road-inclination-related resistance, the method according to the invention can influence the choice of a target gear when driving on both uphill and downhill stretches, where in the first case too much deceleration or a standstill of the motor vehicle are of interest, whereas in the second case too high an acceleration during the gearshift-related traction force interruption, if the target gear to be selected in the context of a conventional shifting strategy is actually engaged, could result in racing of the engine.

The invention now involves the technical principle that when selecting the target gear, as a function of driving resistance, gears are disregarded for the engagement of which from a currently engaged gear, shifting times longer than a respective permitted maximum shifting time are needed. In other words, as soon as a particular current driving resistance has been determined, gearshifts to gears, to shift into which from a currently engaged gear would need shifting times longer than a maximum shifting time, are suppressed.

Such a method for controlling an automated motor vehicle transmission has the advantage that by taking account of the shifting time in the driving resistance-dependent selection of a target gear during a gearshift, it can already be ensured in advance that the motor vehicle concerned, during the engagement of the gear concerned, has not already slowed down too much to allow it to drive off in that gear or indeed has not already come to a standstill. If the engagement of a target gear would require a relatively long time and, because of the traction force interruption taking place during the shifting process, the motor vehicle would go into overdrive, a deceleration of the motor vehicle particularly if the road is inclined steeply upward can already be far advanced. The result is that in some cases the drive engine can provide insufficient traction force in the newly engaged gear, or the engine can even be slowed down below its minimum rotational speed. In an extreme case this can even bring the motor vehicle to a complete standstill during the shifting process, so that it can no longer be driven onward and a downshift to a starting gear has to be carried out.

When, in accordance with the invention, gears are not allowed whose shifting times under the currently prevailing conditions exceed the respective permitted maximum shifting times applicable, it is ensured that a particular target gear can be engaged without the motor vehicle concerned slowing down too much or even coming to a standstill. Consequently, shifting processes can be carried out reliably and comfortably even inter alia when driving on uphill or downhill roads, since multiple gearshifts due to an initially inappropriate target gear are avoided.

It is true that in the case of DE 10 2006 024 277 A1 a current driving resistance is involved in the selection of a target gear, but specific shifting times for the target gears being considered are not taken into account. Consequently, although a target gear suitable for the driving resistance at the time is selected, it can happen, particularly in the case of steep road inclinations or high vehicle masses, that by the time the initially suitable target gear has at last been engaged the motor vehicle has already slowed down substantially and a new gearshift therefore has to be carried out. This correspondingly reduces the comfort.

For this purpose the individual shifting times required for a shift in each case out of an actual gear to the next gear are known by the transmission control system of the motor vehicle transmission, so that the transmission control system can relate those times to a shifting time that is the maximum permissible under the prevailing current driving resistance.

In an embodiment of the invention, in a motor vehicle transmission with a group configuration, any gears for which individual shifts have to be carried out in several transmission groups and which therefore take up a shifting time longer than the permissible maximum shifting time, are disregarded in a driving resistance-dependent manner. This can prevent changes from a current gear to a target gear, to obtain which individual shifts have to be carried out in a plurality of individual gear systems of the group transmission. Since the shifting time is correspondingly made longer compared with the engagement of gears for which only one or only a few individual shifts in individual gear systems of the group transmission have to be carried out, by virtue of such disregarding too great a deceleration of the motor vehicle or an excessive acceleration thereof can be prevented. Then, a shift is not even carried out to the next gear which would otherwise be selected, but rather, driving first continues in the current gear after which a following gear for which the required shifting time is shorter is selected. In the context of the invention a motor vehicle transmission of group configuration preferably consists of a main group, a splitter group connected upstream or downstream from the main group and/or a range group connected downstream from the main group.

In a further version of the invention, gears are disregarded only up to a gear limit, beyond which the target gear is selected regardless of shifting times, This can make allowance for the fact that in motor vehicle transmissions with a progressive gear gradation, decelerations or accelerations of the motor vehicle during the shifting process in the range of the higher gears have a lesser effect on the rotational speed difference to be reduced in each case. This is because since the transmission ratio is smaller in the higher gears, a deceleration or acceleration has a smaller effect on a rotational speed change before a drive engine is coupled, than is the case in the lower gears.

In a further development of the above version, the gear limit is set as a function of the driving resistance and in particular of a road inclination and/or a vehicle mass, In this, it is also preferable to store a performance graph in the transmission control unit of the motor vehicle transmission, in which graph the gear limit is plotted against the vehicle mass and the road inclination. From the graph, the transmission control unit can read out whether, when a target gear is selected, with the current road inclination and vehicle mass a relevant shifting time should be taken into account or whether the selection should take place independently of shifting times.

In a further embodiment of the invention, when gears with shifting times that exceed the permissible maximum shifting time are disregarded, gears are in addition disregarded in which, if engaged, the traction force provided by a drive engine connected upstream from the motor vehicle transmission would not be sufficient given the driving resistance existing at the time. In other words, this also takes into account whether, in gears which could in principle be considered in terms of the time required for their engagement, a traction force sufficient for continued driving with the motor vehicle transmission can be provided. This prevents the method from selecting a gear which, although it could be engaged quickly, would nevertheless be unsuitable for enabling the motor vehicle to continue driving.

In a further development of the above version, in the event that when appropriate gears are disregarded no gears remain available, a shift out of the currently engaged gear is suppressed. Thus, on the basis of the method according to the invention, if the transmission control unit recognizes that with respect to the shifting time and/or the traction force no gears are suitable, then driving continues in the currently engaged gear and no gearshift takes place. In particular, this counteracts the situation that when a shift has been commenced and during the course of the shift it is recognized that the other gears are not suitable for continued driving, a shift back to the original gear would ultimately have to be carried out.

In a further development of the invention, the shifting times needed in each case for shifts from the currently engaged gear to other gears are determined for previous shifts. In this way the transmission control system of the automated transmission can learn what shifting times are needed in each case for a particular shift from the current gear to the other gears considered. Consequently, it can be taken into account that over the operating life of the motor vehicle transmission the shifting times may alter, for example due to wear. Moreover, this also enables compensation of production-related shifting time variations.

The solution according to the invention can also be embodied in the form of a computer program product which, when run on a processor of the transmission control unit, instructs the processor by software means to carry out the associated steps of the method that forms the object of the invention. In this connection a further object of the invention is a computer-readable medium on which the aforesaid computer program product is stored in a recoverable manner.

The invention is not limited to the combination of characteristics indicated in the associated claims or the claims that depend on them. There are other possibilities for combining individual features with one another, insofar as such features emerge from the claims, the description of an example embodiment given below, or directly from the drawings. The reference of the claims to the drawings by the use of indexes is not intended to restrict the protective scope of the claims.

BRIEF DESCRIPTION OF THE DRAWINGS

An advantageous embodiment of the invention, which will be described below, is represented in the drawings, which show.

DETAILED DESCRIPTION OF THE PREFERRED EMBODIMENTS

Figure 1:
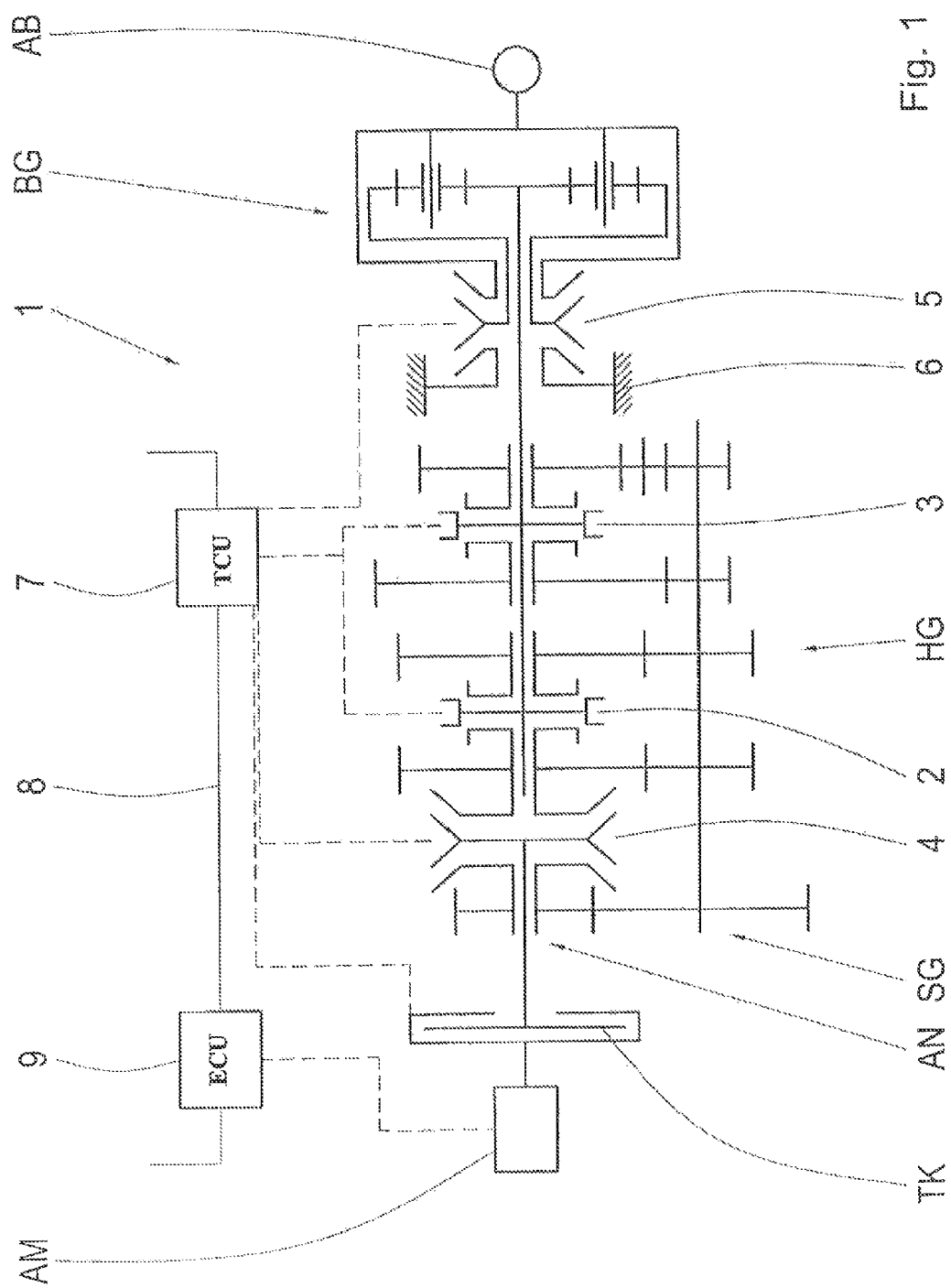
FIG. 1: A schematic representation of part of a drive-train of a motor vehicle with a motor vehicle transmission according to the invention.

FIG. 1 shows a schematic representation of part of a drive-train of a motor vehicle, the motor vehicle preferably being a commercial vehicle such as a truck. Within the drive-train, a drive engine AM in the form of an internal combustion engine can be connected on its drive output side, by means of an intermediate separator clutch TK, to a drive input side AN of a downstream automated motor vehicle transmission 1. In this case the automated change-speed transmission 1 is of group configuration, consisting of an unsynchronized main group HG, a synchronized splitter group SG connected upstream from the main group HG and a synchronized range group BG connected downstream from the main group HG.

In this case the range group BG is of planetary design, whereas both the splitter group SG and the main group HG are formed by individual spur gear stages which, in the case of the main group HG, can be connected into the force flow by means of unsynchronized claw clutches 2 and 3 and in the case of the splitter group SG by means of locking synchronizer 4, and which in each case define various transmission ratios of the respective individual gear systems HG and SG. Furthermore, by means of locking synchronizer 5, a component of the range group BG can either be locked to a further component or fixed to a housing 6 of the motor vehicle transmission 1.

Overall, therefore, by engaging corresponding transmission ratios in the splitter group SG, in the main group HG and in the range group BG, an associated gear of the motor vehicle transmission 1 can be defined, with which drive movement of the drive engine AM is transmitted to a drive output side AB of the motor vehicle transmission 1. To the drive output side AB are then connected further components of the drive-train, which are well enough known to a person familiar with the field.

The individual shifts to be carried out in the individual gear systems are initiated and coordinated by a transmission control unit (TCU) 7, which for that purpose operates the respectively associated actuating devices of the locking synchronizers 4 and 5 and of the claw clutches 2 and 3. While the commercial vehicle is driving, the transmission control unit 7 controls gearshifts in the motor vehicle transmission 1 in such manner that during the gearshifting process, it coordinates a transition between a currently engaged gear defined by the individual gear systems SG, HG and BG and a respective target gear, by actuating the separator clutch TK and controlling the drive engine AM. For that purpose the transmission control unit 7 is connected by way of a data bus system 8 to other control devices of the motor vehicle transmission 1, and also to an engine control unit (ECU) 9 of the drive engine AM.

During the particular gearshift in progress, the transmission control unit 7 interacts prescriptively with the engine control unit 9 and can thereby produce appropriate rotational speeds and torques of the drive engine AM. Likewise—sometimes indirectly by way of a separate control unit—the transmission control unit 7 also controls the opening and closing of the separator clutch TK. In addition, via the data bus system 8 the transmission control unit 7 receives other data relevant for it, inter alia for example a current road stretch inclination, a vehicle mass and sometimes also further parameters relevant to the driving resistance.

Figure 2:
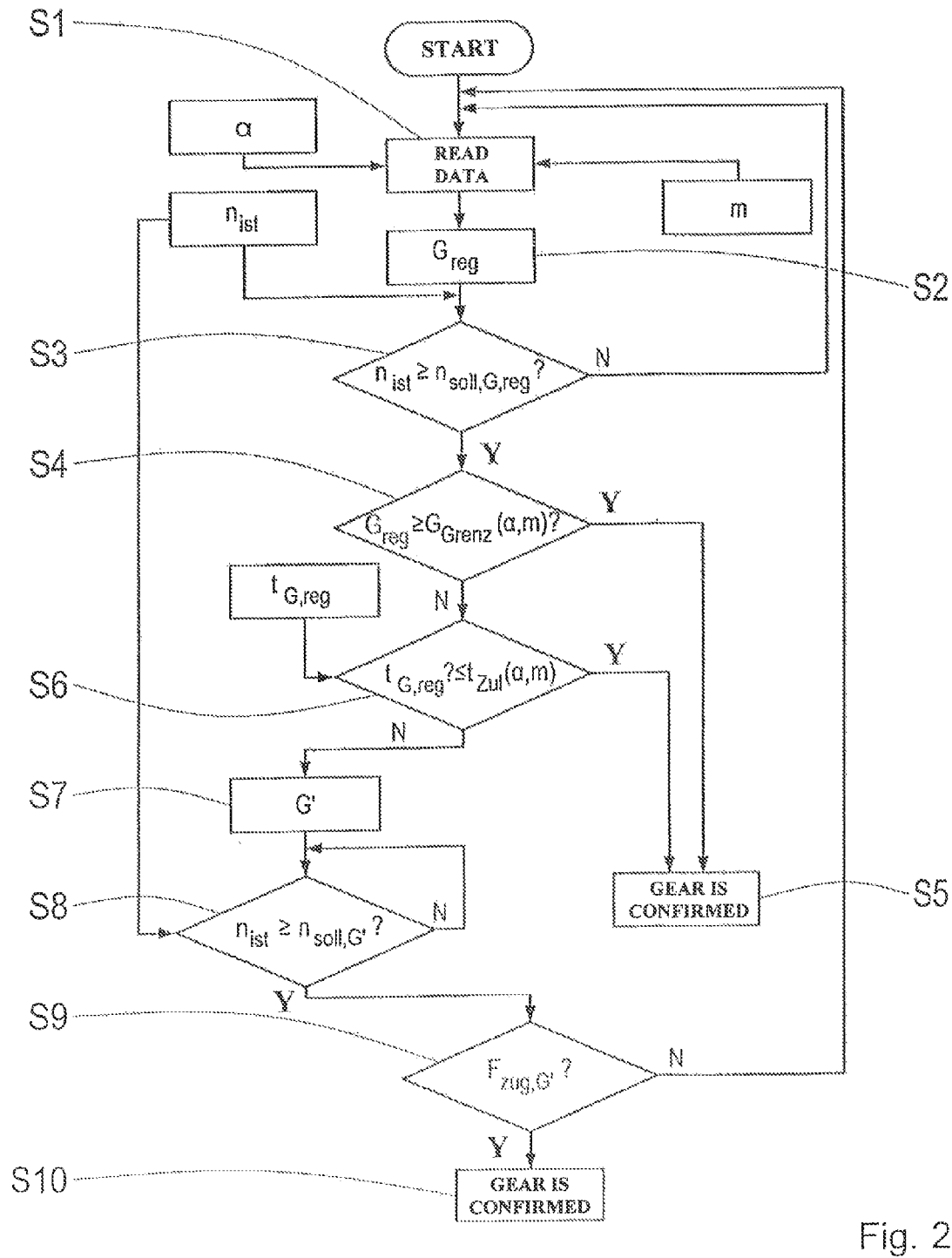
FIG. 2: A flow-chart of a method according to the invention for controlling the motor vehicle transmission shown in FIG. 1.

As a special feature, during the course of a shifting process the transmission control unit 7 is now able to select a target gear to be engaged, taking into account a current driving resistance and in particular a road-inclination-related resistance. The method according to the invention, implemented for that purpose by the transmission control unit 7, will be described in detail below with reference to the flow-chart shown in FIG. 2:

At the beginning of the process, in a step S1 the transmission control unit 7 first reads in relevant data. Among other things the transmission control unit 7 reads in a current road inclination $\alpha$ and a vehicle mass m, and in a next step S2 it checks which target gear $G_{reg}$ should be engaged from the current initial gear in accordance with the regular shifting strategy. This is usually the gear directly following the current gear.

In the transition to step S3 a current actual rotational speed $n_{ist}$ of the drive engine AM is read and during the step S3 it is checked whether this actual rotational speed $n_{ist}$ is higher than or equal to a nominal rotational speed $n_{soll, G.reg}$ for the gear $G_{reg}$. If this is not so, the system springs back to before step S1 and thereafter the parameters $\alpha$, m and $n_{ist}$ are read again.

On the other hand, if the current actual rotational speed $n_{ist}$ is equal to or higher than the nominal rotational speed $n_{soll, G.reg}$, the system advances to step S4 in which, with reference to a performance graph, it is checked whether the gear $G_{reg}$ is lower or higher than a gear limit $G_{Grenz}(\alpha, m)$. In this performance graph, the gear limits $G_{Grenz}(\alpha, m)$ are plotted as a function of the road inclination $\alpha$ and the vehicle mass m. If the gear $G_{reg}$ for the respective currently determined road inclination $\alpha$ and vehicle mass m is the same as or even higher than the gear limit, then in a subsequent step S5, in accordance with the regular shifting strategy the gear $G_{reg}$ is confirmed as the target gear and thereafter engaged by appropriate actuation of one or more actuating devices of the claw clutches 2 and/or 3 or of the locking synchronizers 4 and/or 5.

In contrast, if with the current road inclination $\alpha$ and vehicle mass m the gear $G_{reg}$ is lower that the associated gear limit $G_{G\,renz}(\alpha, m)$, then in a subsequent step S6 it is checked whether a shifting time for the gearshift out of the currently engaged gear to the target gear $G_{reg}$ is shorter than a permitted maximum shifting time $t_{zul}(\alpha, m)$ for the current road inclination $\alpha$ and vehicle mass m. For this, the shifting time $t_{G.reg}$ for the gear $G_{reg}$ will have been determined by the transmission control unit 7 in the context of previous shifts, and stored.

Particularly when the engagement of the gear $G_{reg}$ entails carrying out a plurality of individual shifts in the individual gear systems SG, HG and if necessary also BG, the associated shifting time is relatively long and for certain road inclinations and vehicle masses it will be longer than the permitted maximum shifting time $t_{zul}(\alpha, m)$. If this permitted maximum shifting time $t_{zul}(\alpha, m)$ is exceeded the system then advances to a step S7, whereas otherwise it reverts to step S5 and the gear $G_{reg}$ is confirmed as the target gear.

In step S7 the transmission control unit 7 determines which other gears can be considered, with regard to their shifting times at the current road inclination $\alpha$ and vehicle mass m, or are above the current gear limit $G_{Grenz}(\alpha, m)$. Of these gears, a gear G' is earmarked as the next gear and in a subsequent step S8 it is checked whether the current, actual rotational speed $n_{ist}$ is higher than or equal to the nominal rotational speed $n_{soll,G'}$ for the so-earmarked gear G'. If this is not the case the system springs back to before step S8 and driving and further acceleration first continue in the currently engaged gear.

In contrast, if the current rotational speed $n_{ist}$ corresponds to the nominal rotational speed $n_{soll,G'}$ or if that is reached while continuing to drive in the current gear, then in step S9 it is checked whether, if the gear G' were to be engaged, the traction force $F_{zug,G'}$ would be sufficient for further propulsion of the commercial vehicle. If so, then in step S10 the gear G' is confirmed as the target gear and thereafter it is engaged by appropriate actuation of actuating devices by the transmission control unit 7.

On the other hand, if such is not the case then, as before, the current gear is retained and driving continues in that gear. In some circumstances, thereafter the transmission control unit 7 could identify another gear that can be considered, with regard to its shifting time, and whether that gear can be engaged is tested in a manner analogous to steps S7 to S9. Furthermore, if the current road inclination α changes, then during the course of steps S1 to S6 a gearshift takes place into gear $_{Greg}$ in accordance with the conventional shifting strategy.

By virtue of the method according to the invention for controlling an automated motor vehicle transmission 1, a shifting strategy can be adapted to a driving resistance prevailing at the time.

INDEXES

1 Motor vehicle transmission
2 Claw clutch
3 Claw clutch
4 Barrier synchronization
5 Barrier synchronization
6 Housing
7 Transmission control unit
8 Data bus system
9 Engine control unit
AM Drive engine
AN Drive input side
AB Drive output side
BG Range group
HG Main group
SG Splitter group
TK Separator clutch
    $G_{reg}$ Target gear in accordance with regular strategy
G' Earmarked target gear
$G_{Grenz}(α, m)$ Gear limit
$n_{ist}$ Current rotational speed of the drive engine
$n_{soll,\,G.reg}$ Nominal rotational speed of the drive engine for $G_{reg}$
$n_{soll,\,G'}$ Nominal rotational speed of the drive engine for G'
$t_{G.reg}$ Shifting time for engaging $G_{reg}$
$t_{zul}(α,)$ Maximum permitted shifting time
$F_{zug,\,G'}$ Traction force in gear G'
α Road inclination
m Vehicle mass

The invention claimed is:

1. A method of controlling an automated motor vehicle transmission (1), the method comprising the steps of:
    taking into account a current driving resistance when selecting a target gear ($G_{reg}$, G') to be engaged as part of a shifting process, and
    during selecting the target gear ($G_{reg}$, G') to be engaged, disregarding, in a driving resistance-dependent manner, gears for shifting from a currently engaged gear with shifting times ($t_{G\,reg}$) that are longer than a respective permitted maximum shifting time ($t_{zul}(α, m)$).

2. The method according to claim 1, further comprising the step of, if the motor vehicle transmission comprises a group configuration, disregarding, in a driving resistance-dependent manner, gears whose engagement entails individual shifts in a plurality of transmission groups and, therefore, requires shifting times ($t_{G.reg}$) longer than the permitted maximum shifting time ($t_{zul}(α, m)$).

3. The method according to claim 1, further comprising the step of disregarding gears only up to a gear limit ($G_{Grenz}(α, m)$), beyond which the target gear ($G_{reg}$, G') is selected independently of shifting times.

4. The method according to claim 3, further comprising the step of setting the gear limit ($G_{Grenz}(α, m)$) as a function of the driving resistance, having regard to a road inclination (α) and a vehicle mass (m).

5. The method according to claim 1, further comprising the step of besides disregarding gears with shifting times ($t_{G.reg}$) longer than the permitted maximum shifting time ($t_{zul}(α, m)$), disregarding gears which, if engaged, a traction force ($F_{zug,\,G'}$) provided by a drive engine (AM) connected upstream from the motor vehicle transmission (1) would be insufficient for the driving resistance at the time.

6. The method according to claim 5, further comprising the step of, after disregarding those gears that are to be disregarded, preventing a gearshift out of the currently engaged gear when no selectable gear remain available for the gearshift.

7. The method according to claim 1, further comprising the step of determining, during previous shifts, the shifting times ($t_{G\,reg}$) required in each case for shifting out of the current gear to other gears.

8. The method according to claim 1, further comprising the step of operating the method in an automated motor vehicle transmission (1).

9. A computer program for of an automated motor vehicle transmission (1) which is operated in accordance with a method of controlling an automated motor vehicle transmission (1), the method comprising the steps of: taking into account a current driving resistance when selecting a target gear ($G_{reg}$, G') to be engaged as part of a shifting process, and during selecting the target gear ($G_{reg}$, G') to be engaged, disregarding, in a driving resistance-dependent manner, gears for shifting from a currently engaged gear with shifting times ($t_{G.reg}$) that are longer than a respective permitted maximum shifting time ($t_{zul}(α, m)$);
    wherein a routine for carrying out a gearshift in the automated motor vehicle transmission (1) is implemented by corresponding control commands stored in a software system.

10. The computer program product of the automated motor vehicle transmission (1) according to according to claim 9, wherein the computer program product is stored on a computer-readable storage medium.

11. A method of controlling an automated transmission of a motor vehicle, the method comprising the steps of:
    initiating a gearshift from a currently engaged gear to a target gear;
    determining a current driving resistance of the motor vehicle;
    considering, from possible targets gears to be selected, at least one potential target gear;
    removing the potential target gear from consideration as the target gear, if, based on the current driving resistance, a required amount of time to shift from the currently engaged gear to the potential target gear exceeds a respective permitted maximum shifting time; and
    selecting the considered potential target gear as the target gear for the gearshift.

* * * * *